United States Patent [19]

Tsuzuki et al.

[11] Patent Number: 4,715,527
[45] Date of Patent: Dec. 29, 1987

[54] ULTRASONICALLY SEALED SIDE SEAM ON CUP

[75] Inventors: Kiyoshi Tsuzuki; Sigeto Tanaka, both of Sagamihara; Yoshiaki Take, Fujisawa, all of Japan

[73] Assignee: Toppan Printing Co., Ltd., Tokyo, Japan

[21] Appl. No.: 907,123

[22] Filed: Sep. 11, 1986

Related U.S. Application Data

[60] Continuation of Ser. No. 765,171, Aug. 12, 1985, abandoned, which is a continuation of Ser. No. 534,259, Sep. 20, 1983, abandoned, which is a continuation of Ser. No. 340,357, Jan. 18, 1982, abandoned, which is a division of Ser. No. 217,217, Dec. 17, 1980, Pat. No. 4,374,697.

[30] Foreign Application Priority Data

| Dec. 26, 1979 [JP] | Japan | 54-169600 |
| Dec. 26, 1979 [JP] | Japan | 54-169601 |
| Dec. 26, 1979 [JP] | Japan | 54-169602 |
| Dec. 26, 1979 [JP] | Japan | 54-180535 |

[51] Int. Cl.$^4$ .............................................. B65D 3/28
[52] U.S. Cl. ................................ 229/1.5 B; 229/3.1; 229/48 T
[58] Field of Search ............... 229/3.1, 17 G, 1.5 B, 229/48 SA, 48 T

[56] References Cited

U.S. PATENT DOCUMENTS

| 2,144,456 | 1/1939 | Heywood | 229/1.5 B |
| 2,279,289 | 4/1942 | Page | 229/1.5 B X |
| 3,137,431 | 6/1964 | Crouse et al. | 229/1.5 B |
| 3,182,882 | 5/1965 | Aellen, Jr. et al. | 229/1.5 B X |
| 3,438,824 | 4/1969 | Balamuth | 156/502 |
| 3,604,613 | 9/1971 | Haas | 229/17 G |
| 3,827,620 | 8/1974 | Ludder | 229/1.5 B |
| 3,867,232 | 2/1975 | Thompson et al. | 156/502 |
| 3,912,576 | 10/1975 | Braun | 156/580.2 |
| 3,931,378 | 1/1976 | Goehring | 229/1.5 B X |
| 3,956,046 | 5/1976 | Tsuchiya et al. | 156/73.4 |
| 4,117,971 | 10/1978 | Itoh | 229/1.5 B |
| 4,187,768 | 2/1980 | Suzuki | 493/109 |
| 4,374,697 | 2/1983 | Tsuzuki et al. | 156/580.2 |

FOREIGN PATENT DOCUMENTS

1402124 5/1965 France .................. 229/1.5 B

Primary Examiner—Stephen Marcus
Assistant Examiner—Gary E. Elkins
Attorney, Agent, or Firm—Robert T. Gammons

[57] ABSTRACT

A container comprising a tubular body part having a longitudinal lapped side seam and a bottom part attached to one end thereof, characterized in that the overlapping portions of the side seam are adhered by ultrasonic bonding to provide a bonded area longitudinally of the side seam of predetermined transverse width throughout the major portion of its length and a bonded area at the top of greater transverse width which is at least several millimeters in length longitudinally of the seam.

3 Claims, 14 Drawing Figures

FIG. 1 PRIOR ART
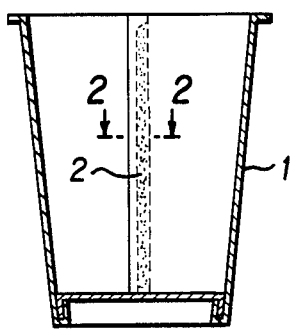
FIG. 3
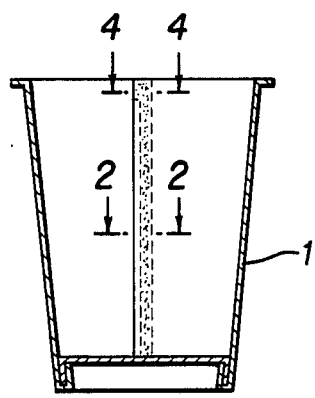
FIG. 2 PRIOR ART
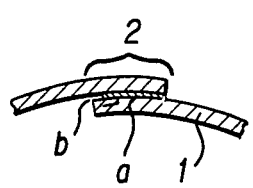
FIG. 4
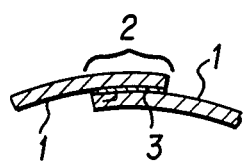
FIG. 5
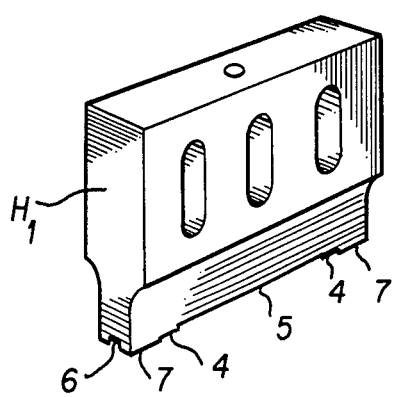
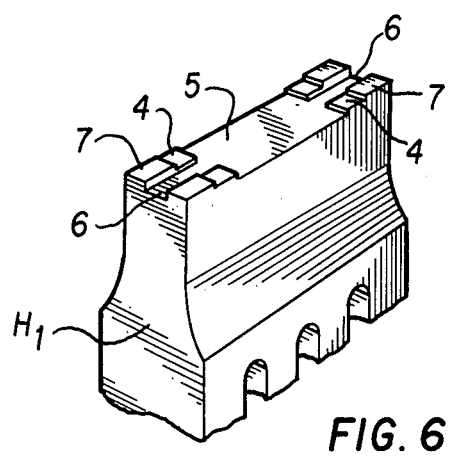
FIG. 6
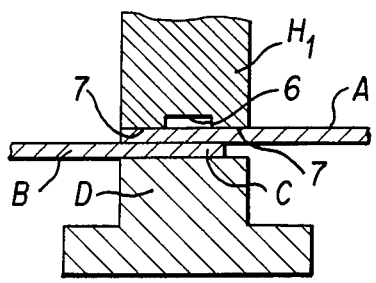
FIG. 7

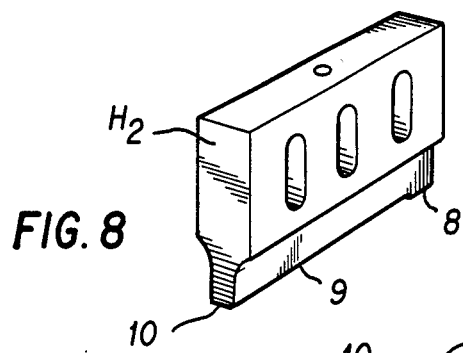
FIG. 8
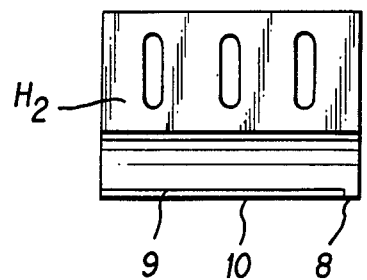
FIG. 9
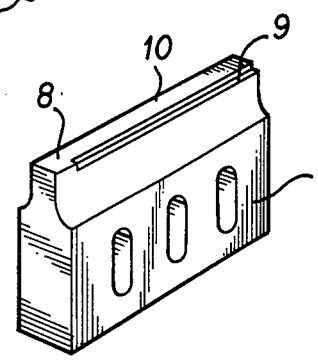
FIG. 10
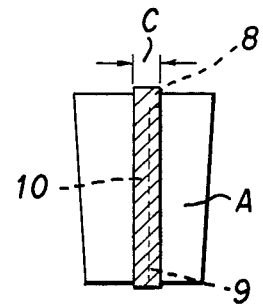
FIG. 11
FIG. 12
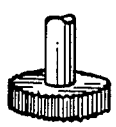
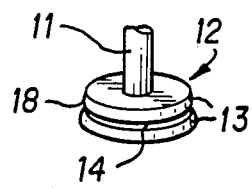
FIG. 14
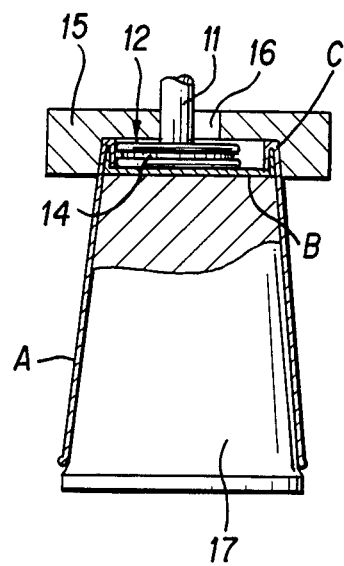
FIG. 13

ULTRASONICALLY SEALED SIDE SEAM ON CUP

This is a continuation of co-pending application Ser. No. 765,171 filed on Aug. 12, 1985, now abandoned, which is a continuation of 06/534,259 filed 9/20/83, now abandoned, which is a continuation of 06/340,357 filed 1/18/82, now abandoned, which is a division of 06/217,217 filed 12/17/80, now U.S. Pat. No. 4,374,697.

BACKGROUND OF THE INVENTION

1. Field of the Invention

The present invention relates to a container consisting of a body and a bottom plate of cardboard laminated with a plastic material, and a method and a device for manufacturing the same.

More particularly, the present invention relates to a container in which the side superimposed portion of the container is completely adhered to a distance of 2 to 3 mm from the upper end, and the upwardly folded portion of the lower end of the body is adhered to the downwardly folded portion of the periphery of the bottom plate; and to a method and a device for manufacturing the body and the bottom plate of such a container.

2. Description of the Prior Art

Plastic laminated paper sheets have conventionally been used for containers for holding liquids. In many such containers, juices, rice wine or the like are exposed to portions laminated with paper sheets, aluminum foils, synthetic resin, or the like for facilitating flowability of the content of the container at room temperature, and the containers are sealed with film-shaped lids. In general, the liquid must be heated to a high temperature for heat-sealing the container. In such a case, when 2 to 3 mm of the side superimposed portion from the upper end of the cup is not completely adhered, the contents seep from the upper end of the cup to the outside under capillary action. This hinders the heat-sealing of the lid and results in incomplete sealing. This permits leakage of the contents to the outside, introduction of air, and so on. Thus, this container is unsuitable as a container for holding liquids which are flowable at room temperature. The superimposed portion of a blank is generally sealed linearly in a certain width. However, as shown in FIG. 2, when viewed from its section, a sealed portion a does not extend to the inner end surface. In this figure, numeral 1 denotes a cup body and 2 is a superimposed portion at both ends of the blank of the body. In some cases, the side end of the blank which comes inside the container is skived to a certain extent from the outside. The unskived portion is folded outwardly, and the side ends of the body are superimposed on each other and sealed so that only the portion of the body which is laminated with polyethylene is brought into contact with the liquid inside the container. Thus, the permeation of the liquid when the side edge is cut and exposed to the liquid is eliminated. In any case, in a conventional cup-shaped sealed container for holding liquids, the sealed portion is as shown in FIG. 2. Since the liquid inside the container is at a high temperature when the lid is heat-sealed, the liquid permeates by capillary action to the outside from an unsealed portion b. This hinders the heat-sealing and has presented problems in the manufacturing procedure.

Conventionally, when adhering the side superimposed portion of the container body for forming the body, the contacting surface of an ultrasonic horn to the upper side superimposed portion is flat. However, when the side superimposed portion is adhered with such a conventional ultrasonic horn, the adhesion gradually weakens from the center of the horn contacting surface toward the outside, and the adhesion of both ends, especially the portions 2 to 3 mm from the ends, is not complete. When an attempt is made to completely adhere these portions, problems arise such as cracks at the central portion of the side superimposed portion.

A device has conventionally been used for hot-pressing the bottom plate of the container. The device consists of an outer press mold for receiving the adhering portion of the lower end of the container body and the periphery of the bottom plate, and further consists of a knurling tool rotating inside the outer press mold. Since there are a number of recesses and projections at the portion of the knurling tool which is brought into contact with the above-mentioned adhering portion in the direction of rotation of the knurling tool, cracks form there, leading to leakage of the contents and so on.

SUMMARY OF THE INVENTION

It is, therefore, the primary object of the present invention to provide, in a container consisting of a container body and a bottom plate of cardboard laminated with a plastic material as raw materials, a container in which the side superimposed part of the body is completely adhered and the upwardly folded part of the lower end of the body and the downwardly folded part of the periphery of the bottom plate are completely adhered for excellent sealing effects; and to provide a method and a device for manufacturing the same.

In order to accomplish the above and other ends, the present invention provides a container characterized in that the side superimposed portion of the body is completely adhered to a distance of 2 to 3 mm from the upper end, and the upwardly folded portion of the lower end of the body and the downwardly folded portion of the periphery of the bottom plate are adhered.

According to another object of the present invention, there is provided a forming device for manufacturing such a container comprising an ultrasonic welding device mounting an ultrasonic horn having a step between a contacting surface to the side superimposed portion of the container 2 to 3 mm from the upper end and a contacting surface to the portion below the portion 2 to 3 mm from the upper end; an outer press mold in which can be fitted the outer circumference of the adhering portion of the periphery of the bottom plate and the body, said outer press mold having a circular hole at the center for a knurling shaft with a diameter sufficiently larger than that of the shaft; and a knurling tool having a disk-shaped body for outwardly pressing said adhering portion against the inner wall of the outer press mold, having an outer circumferential wall that is in contact with the adhering portion of the lower end of the container body and the bottom plate, and having an annular groove of certain width at its central portion, said knurling tool revolving on its axis as well as along the inner wall of the circular hole.

According to another aspect of the present invention, there is also provided a method for manufacturing a container of the type described, said container consisting of the body and the bottom plate manufactured with such a forming device.

BRIEF DESCRIPTION OF THE DRAWINGS

FIG. 1 is an explanatory view of a conventional sealed container;

FIG. 2 is an enlarged section taken on the line 2—2 of FIG. 1 and on the line 2—2 of FIG. 3;

FIG. 3 is a vertical diametral section of the sealed container of the present invention;

FIG. 4 is an enlarged section taken on the line 4—4 of FIG. 3;

FIG. 5 is a perspective view illustrating the first embodiment of the horn of an ultrasonic welding device of the present invention;

FIG. 6 is a perspective view illustrating the horn contacting portion of the device shown in FIG. 5; and FIG. 7 is a partial sectional view illustrating the manner in which the welding is performed by the ultrasonic welding device of the present invention.

FIG. 8 is a perspective view illustrating the shape of the horn according to the second embodiment used in the ultrasonic welding device for the container of the present invention;

FIG. 9 is a front view of the horn shown in FIG. 8;

FIG. 10 is a perspective view illustrating the shape of the contacting portion of the horn shown in FIG. 8;

FIG. 11 is an explanatory view illustrating the manner the welding is performed by the welding device adopting the horn shown in FIG. 8;

FIG. 12 is a perspective view of a knurling tool used for forming the bottom part of a conventional container;

FIG. 13 is an explanatory view of the bottom forming device of the container of the present invention; and FIG. 14 is a perspective view of the knurling tool of the bottom forming device of the present invention.

DETAILED DESCRIPTION OF THE PREFERRED EMBODIMENTS

It is, therefore, the primary object of the present invention to provide, in a container consisting of a container body and a bottom plate of cardboard laminated with a plastic material as raw materials, a container in which the side superimposed part of the body is completely adhered and the upwardly folded part of the lower end of the body and the downwardly folded part of the periphery of the bottom plate are completely adhered for excellent sealing effects; and to provide a method and a device for manufacturing the same. The present invention will now be described in more detail with reference to the accompanying drawings. FIG. 3 is an explanatory view of a container of the present invention in which the side seal 2 to 3 mm from the upper end, as designated by numeral 3, is formed into a completely sealed portion with an adhesive to eliminate the problems of the prior art. The section along the line A—A of FIG. 3 is shown in FIG. 4. As may be seen in FIG. 2 from the sectional view along the line B—B of FIG. 3, at tne portion of the side seal below the portion 2 to 3 mm from the upper end, the sealing is incomplete, leaving a non-sealed portion b. At the portion below the portion 2 to 3 mm from the upper end, this presents fewer problems for heat-sealing the lid, so that this condition is acceptable. However, by performing complete sealing of the sealed portion 3 (completely sealed portion) 2 to 3 mm from the upper end, the heat sealing with a closed lid at a high temperature may be completely performed.

Describing the method and the device for welding the body superimposed portion of the container of the present invention, FIGS. 5 and 6 show the first embodiment of the horn of the ultrasonic welding device according to the present invention, in which a slightly stepped longitudinal groove is formed at the center of the contacting surface of the horn, and both sides of the groove of the contacting surface are gradually stepped toward the center to provide an excellent result. In these figures, numeral 4 denotes first stepped portions, 5 is a second stepped portion and 6 is a central longitudinal groove, and 7 are contacting surfaces. The dimensions of the horn were as follows: the stepped difference between the contacting surfaces 7 and the second stepped portion was 0.02 mm, the width of the lower surface of the horn was 12.7 mm, the sides of the contacting surfaces were each 4.5 mm, the length of the contacting surfaces was 152.4 mm, the length of the first stepped portions 4 were each 11.2 mm, the length of the second stepped portion were each 90 mm, the depth of the central longitudinal groove 6 was 0.02 mm, and the width of the central longitudinal groove 6 was 3.7 mm. With an ultrasonic welding device with such a horn, the ultrasonic welding of the body superimposed portion of the blank was performed at 20 HK and 3 KW by the blank setting method, the diameter of the air cylinder being 3 inches.

| Contact time (seconds) | Holding time (seconds) | Air pressure (psi) | Loading (%) |
|---|---|---|---|
| 0.3 | 0.1–0.3 | 70 | 50–60 |
| 0.35 | 0.1–0.3 | 60 | 50–60 |
| 0.4 | 0.1–0.3 | 50–70 | 50–60 |

With this method, it was possible to seal the entire surface without cracks. FIG. 7 shows a partial section of the side seal welded by ultrasonic welding. In this figure, symbols A and B denote edges at the ends of the blank, C is a skived portion, and D is a receiving jig.

Complete sealing was possible, and no cracks were observed in either pre- or post-oscillation (oscillation was performed after setting the horn).

The use of such an ultrasonic welding device of the present invention eliminates the problem of the prior art i.e., when the side superimposed portion of the blank is welded with a conventional ultrasonic welding device including a horn with a flat contacting surface, the adhesion gradually weakens from the center toward the outside of the horn contacting part, so that the ends of the sealed portion are not welded, cracks are formed at the central portion, and cracks are also formed when the sides of the blank is shifted in pressing the horn for oscillation.

Describing the second embodiment of the welding device of the present invention, as shown in FIGS. 8 and 9, an ultrasonic horn ($H_2$) has a shape such that a stepped portion 9 is formed at one edge of the contacting surface of the horn to the side superimposed portion, and this stepped portion is absent at the part corresponding to the vicinity of the upper end of the superimposed part. Describing the manner in which the ultrasonic horn ($H_2$) acts on the body superimposed part of the container body, FIG. 11 shows the relative positions of the body superimposed part and the horn seal wherein symbol A designates a blank, B is a sealed portion and C is the horn contacting position. When sealed by ultrasonic waves in this manner, the container is as shown in FIG. 4 wherein the hatched part is the completely sealed part, and the part 3 of the side seal 2 to 3 mm from the upper end is sealed widely so that the part most susceptible to cracks may be reinforced. FIG. 2 is a sectional view along the line 2—2' of FIG. 3, and FIG. 4 is a sectional view along the line 4—4' thereof. Referring to FIG. 4, the widely sealed portion 3 is a portion sealed by the non-stepped portion 8 of the horn, and the completely adhered portion a and the non-sealed portion b are coexistant at the part of the sealed part below this portion 8. Symbol a denotes a sealed portion sealed by a lower surface 10 of the horn, and the non-sealed portion b is the portion formed by the stepped portion 9 of the horn.

Finally, describing the method and device for forming the bottom part of the container of the present invention, numeral 17 denotes a mandrel and 15 denotes an outer press mold in FIGS. 12, 13 and 14. The lower end of a cup A is heat-sealed to the folded portion of a bottom plate B and C is the adhering portion. Numeral 12 denotes a knurling tool, and 16 is a circular hole formed at the center of the outer press mold and having a diameter sufficiently greater than that of a knurling tool shaft 11. The knurling tool is a disk which is smaller than the bottom adhering portion. The knurling tool rotates on its axis as well as along the inner wall of the circular hole at the center of the outer press mold. The adhering portion is strongly pressed between the mandrel 17 and the outer press mold 15. The outer circumferential wall 18 of the knurling tool 12 has a tapered portion 13 like the tapered portion of a container such as a cup as shown in FIG. 13. Since an annular groove 14 of a certain width is formed at its central portion, the pressing force against the adhering portion is great. Since the adhering portion has no projections or recesses in the axial direction and is smooth, the bottom part is not of a zigzag form as in the conventional cases. Thus, no cracks are formed, no leakage of the contents is caused, and the outer appearance is superior.

Although the description has been made with respect to a container having a frustoconical body, the same effects may be obtained with a disk-shaped knurling tool having a vertical outer circumferential wall for a container having a cylindrical body.

What is claimed is:

1. A container comprising a tubular frustoconical side wall member having open ends, one of which is of smaller diameter than the other and a flat circular bottom member disposed at the open end of smaller diameter; said side wall member comprising a trapezoidal blank laminate of two coextensive plies, one ply comprising cardboard and the other ply comprising plastic, said trapezoidal blank having spaced, parallel top and bottom edges and symmetrically converging side edges and said blank being formed to assume said tubular frustoconical configuration with the cardboard ply at the outside and the plastic ply at the inside and with the side edges overlapping such that the plastic ply at the inner marginal edge of the outer one of the side edges is disposed in contact with the paperboard ply at the outer marginal edge of the inner one of the side edges, said side wall member having at its upper end a radially-disposed lip and at its lower end an inwardly-disposed upturned flange defining a groove peripherally of the lower end, the inner surface of which is constituted by the plastic ply and said bottom member corresponding in diameter to the open end of smaller diameter and being provided with a downturned peripheral flange turned downwardly from the plastic side such as to have contact with the inner plastic side of the side wall member at the lower end and wherein the cardboard ply at the marginal edge of the inner one of the side edges is skived and the plastic ply at said marginal edge folded to dispose the plastic ply about the end edge into contact with the plastic ply at the inner side of the outer one of the side edges and wherein the lapped ends are ultrasonically bonded using an ultrasonic horn throughout an area coextensive with the confronting overlapping surfaces thereof from the rim at the top downwardly along the overlapping surfaces at least several millimeters to reinforce the top and wherein the confronting overlapping surfaces of the lapped ends along the remainder of the distance toward the bottom are adhered to each other throughout an area corresponding in length to the remainder of the distance toward the bottom and in width from the edge of the outer one of the lapping ends toward the edge of the inner one of the lapping ends a distance less than the width of the overlapping surface such that the remainder of the confronting surfaces are unattached.

2. A container according to claim 1 wherein the plastic is polyethylene.

3. A container according to claim 1 wherein the sealed area at the top of the container is 2 to 3 millimeters in length longitudinally of the side seam.

* * * * *